(12) United States Patent
Liu et al.

(10) Patent No.: US 7,519,528 B2
(45) Date of Patent: Apr. 14, 2009

(54) BUILDING CONCEPT KNOWLEDGE FROM MACHINE-READABLE DICTIONARY

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 10/741,179

(22) Filed: Dec. 19, 2003

(65) Prior Publication Data

US 2004/0153311 A1 Aug. 5, 2004

(30) Foreign Application Priority Data

Dec. 30, 2002 (CN) ............................. 02 1 60013

(51) Int. Cl.
*G06F 17/28* (2006.01)
*G06F 17/30* (2006.01)

(52) U.S. Cl. ............................................. 704/2; 707/4
(58) Field of Classification Search .................. 704/2; 707/4
See application file for complete search history.

(56) References Cited

U.S. PATENT DOCUMENTS 5,541,837 A * 7/1996 Fushimoto ...................... 704/2

7,158,930 B2 * 1/2007 Pentheroudakis et al. ..... 704/10

OTHER PUBLICATIONS

Claire Cardie, "A Case-Based Approach to Knowledge Acquisition for Domain-Specific Sentence Analysis", Proc. 11th National Conference on Artificial Intelligence, MIT Press, 1993, p. 798-803.*
Pascale Fung, "Compiling Bilingual Lexicon Entries from a Non-Parallel English-Chinese Corpus", 1995.*
D. Hiemstra, "Using statistical methods to create a bilingual dictionary", Master's Thesis, Dept. of Computer Science, University of Twente, The Netherlands, 1996.*
Benjamin Han, "Building a Bilingual Dictionary with Scarce Resources: A Genetic Algorithm Approach," 2000.*

* cited by examiner

*Primary Examiner*—Talivaldis Ivars Smits
(74) *Attorney, Agent, or Firm*—Scully, Scott, Murphy & Presser, P.C.; Lisa M. Yamonaco

(57) ABSTRACT

This invention relates to a computer system and methods, apparatus and systems for building concept knowledge from a machine-readable dictionary. The machine-readable dictionary includes a plurality of words in a first language and a plurality of corresponding translated words in a second language, and a plurality of words in the second language and a plurality of corresponding translated words in the first language. The method comprises steps of providing a seed word in the first language; forward-translating said seed words to obtain a plurality of translated words corresponding to said seed word by looking up said machine-readable dictionary; and backward-translating said translated words to obtain a plurality of translated words in the first language corresponding to each of said plurality of translated words obtained by said step of forward-translating respectively, as words of the concept knowledge, by looking up said machine-readable dictionary.

22 Claims, 8 Drawing Sheets

BUILDING CONCEPT KNOWLEDGE FROM MACHINE-READABLE DICTIONARY

FIELD OF INVENTION

The present invention relates to data processing in computer system, and particularly to the technology of building concept knowledge in computer system.

BACKGROUND OF THE INVENTION

Concept knowledge consists of a group of terms (words) describing a category of events, ideas, objects, actions, or intentions. For example, concept knowledge relevant to "to have in mind/plan" includes terms as "plan", "hope", "want", "prepare", "mean", "will", "figure", "think", "require", "long for" etc., which describe an intention to do something. Concept knowledge is widely used in many applications, such as information retrieval, natural language processing, machine translation, thesaurus construction and the like.

When people retrieve information in a particular field, their concept knowledge about this field directly affects their searching behavior. A person mastering relatively complete concept knowledge is capable of constructing proper search queries, preparing a plurality of synonyms for search query terms, changing his strategies properly when his first attempt is unsuccessful and identifying relevant retrieved information correctly. Thus, experts in a particular field can get higher success rates than those who know little concept knowledge about this field when retrieving information.

At present, the Internet has become a worldwide information source and principal business tool. The most direct and most convenient approach to search information on the Internet is to use a search engine. Most of the existing search engines employ keyword-based search systems. Concept knowledge can help users find desired useful information among a great deal of various data, and help users construct, modify, improve search queries, automatically expand their search.

In addition, in natural languages processing (NLP), statistical natural language processing method determines the likelihood of word features (e.g. word combination) based on frequencies of these words in a training corpus. When the frequency of a word does not warrant reliable maximum likelihood estimation, the word's probability can be computed as a weighted sum of the probabilities of words that are similar to it. For example, the statistical natural language processing method determines the likelihood of a word combination from its frequency in a training corpus. However, due to the nature of the language itself, many word combinations appear with low frequencies in a given corpus, or do not appear at all, this situation is called as a problem of data sparseness in statistical natural language processing. In such a case, "the most similar" word in concept knowledge may be used to estimate the probability of the word combination that appear with low frequency or do not appear.

Besides, in machine translation, such as a corpus-based machine translation system, if a word W need to be translated, a possible translation for W may be selected from a set of similar words in the same concept knowledge appeared in the same context.

Due to such wide applications of concept knowledge, efforts have been made to develop methods for acquiring concept knowledge. At present, the method for extracting terms belonging to a particular concept is using a lexical knowledge base, such as WordNet, to extract concept knowledge. However, such lexical knowledge bases are typically designed for general purposes. For a particular application domain, the concept knowledge provided by such lexical knowledge bases is not sufficient in details, and thus cannot satisfy particular requirements in practical applications.

SUMMARY OF THE INVENTION

According to one aspect of the invention, there is provided a computer system for building concept knowledge from a machine-readable dictionary, comprising: a machine-readable dictionary including a plurality of words in a first language and a plurality of corresponding translated words in a second language, and a plurality of words in the second language and a plurality of corresponding translated words in the first language; an input device for inputting a seed word; a forward-translator for obtaining a plurality of translated words in the second language corresponding to said seed word by looking up said machine-readable dictionary; and an backward-translator for obtaining a plurality of translated words in the first language corresponding to each of said plurality of translated words obtained by said translator respectively as words of the concept knowledge, by looking up said machine-readable dictionary.

According to another aspect of the invention, there is provided a computer system for building concept knowledge from a machine-readable dictionary, comprising: the machine-readable dictionary, including a plurality of words in a first language and a plurality of corresponding translated words in a second language, and a plurality of words in the second language and a plurality of corresponding translated words in the first language; an input device for inputting a seed word; a translator for translating a word into a plurality of translated words in a desired language by looking up said machine-readable dictionary; and a decision making means for controlling said translator to translate the seed word into a plurality of translated words in the second language and to translate each of the translated words in second language into a plurality of translated words in the first language respectively as words of the concept knowledge.

According to further aspect of the invention, there is provided a method for building concept knowledge in a computer system from a machine-readable dictionary, the machine-readable dictionary including a plurality of words in a first language and a plurality of corresponding translated words in a second language, and a plurality of words in the second language and a plurality of corresponding translated words in the first language, said method comprising steps of providing a seed word in the first language; forward-translating said seed word to obtain a plurality of translated words corresponding to said seed word by looking up said machine-readable dictionary; and backward-translating said translated words to obtain a plurality of translated words in the first language corresponding to each of said plurality of translated words obtained by said step of forward-translating respectively, as words of the concept knowledge, by looking up said machine-readable dictionary.

According to still another aspect of the invention, there is provided a method for data retrieval in a computer system comprising obtaining a plurality of words belonging to a concept knowledge associated with a keyword, by the above-described method for building concept knowledge in a computer system from a machine-readable dictionary with said keyword as the seed word; and retrieving data using said plurality of words of the concept knowledge obtained.

BRIEF DESCRIPTION OF THE DRAWINGS

The above features, advantages and objectives of the present invention will become apparent through the description of preferred embodiments of the present invention with reference to the following drawings.

DETAILED DESCRIPTION OF THE INVENTION

Next, detailed description will be given to the preferred embodiments of the present invention with reference to the accompanied drawings.

Machine-readable dictionaries are widely used in computer systems, the technology of which is continuously updated. There are many kinds of machine-readable dictionaries, such as monolingual, bilingual, multilingual, bi-directional and etc.; and words and their translations in machine-readable dictionaries are continuously updated with the evolution of natural languages. A machine-readable dictionary typically comprises words in one or more languages and corresponding translations in one or more languages.

Figure 6:
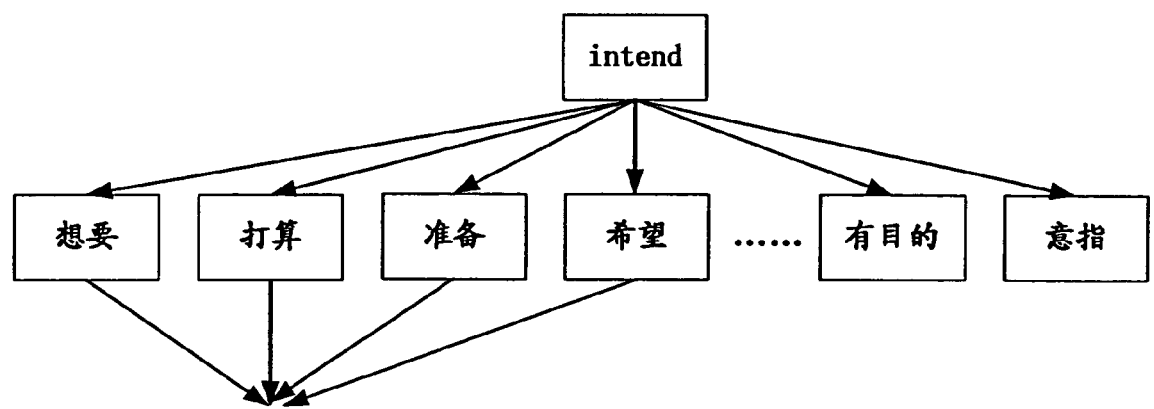
FIG. 6 is an example showing the correspondence between a word and its translated words in an English-Chinese bilingual machine-readable dictionary.

The purpose of a machine-readable dictionary is to translate meanings of words, that is, to explain a word (hereafter, "a word" means a word or a word group) by using a plurality of words with similar meanings, therefore, a machine-readable dictionary naturally provides wide range of information about words related to a specific concept. For example, in an English-Chinese bilingual dictionary, an English word corresponds to a plurality of Chinese words, all or some of these Chinese words are closely related to each other, belonging to the same concept knowledge. FIG. 6 is an example showing a word and its correspondence with other words in an English-Chinese bilingual machine-readable dictionary. As shown in FIG. 6, English word "intend" corresponds to a plurality of Chinese words, such as "ó□ want', "S— plan", "Æ• prepare", "← hope", "î, aim at", "¤ • mean" and so on, of which "ó□ want', "S— plan", "Æ• prepare", "← hope" are closely related words of the same concept.

Figure 1:
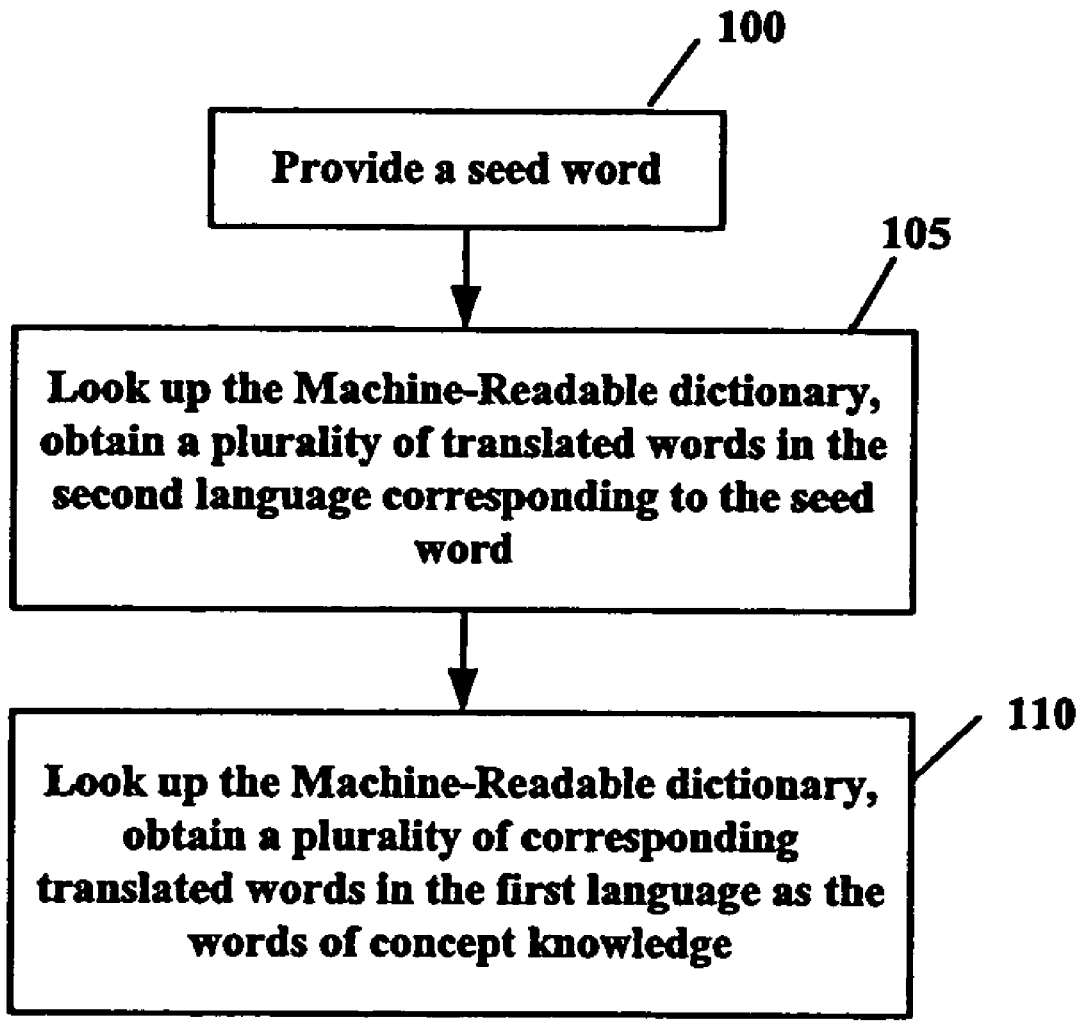
FIG. 1 is a flowchart showing the method for building concept knowledge in a computer system from a machine-readable dictionary according to an embodiment of the present invention.

Utilizing the above-mentioned features of natural languages and machine-readable dictionaries, the invention proposes a method for building concept knowledge in a computer system from a machine-readable dictionary. FIG. 1 shows a flowchart of a method for building concept knowledge in a computer system from a machine-readable dictionary according to a preferred embodiment of the invention. In the embodiment, a bilingual, bi-directional machine-readable dictionary is preferably used, such as the machine-readable dictionary including English vocabulary entries and Chinese vocabulary entries as well as their corresponding Chinese translated words and English translated words respectively. It should be understood that there is no limitation to particular implementation of machine-readable dictionary in the present invention and that it is also possible to perform translation of words by using a combination of a plurality of machine-readable dictionaries.

In FIG. 1, first at Step 100, a seed word is provided. The seed word may be input by a user via an input device, for example, by typing in a keyword input box on a web page of a search engine, and may also be generated automatically by computer program. Here, the language of the seed word is taken as the first language.

Next, at Step 105, a plurality of translated words in a second language corresponding to the seed word are obtained by looking up the machine-readable dictionary. For example, when the machine-readable dictionary is an English-Chinese bilingual dictionary and the seed word is "intend", at this step, a plurality of Chinese translated words corresponding to "intend": "S— plan", "ó□ want", "← hope", "Æ• prepare", "î, aim at", "vï hurry up for a journey", "¤ • mean" and the like, are obtained by looking up the machine-readable dictionary.

Then, at Step 110, a plurality of translated words in the first language corresponding to each of said plurality of translated words obtained by the previous step 105, are obtained as the words of a concept knowledge, by looking up said machine-readable dictionary. Also in the above-mentioned example, at this step, it is possible to find corresponding English translations for those Chinese translated words (i.e. "S— plan", "ó□ want", "← hope", "Æ• prepare", "î, aim at", "vï hurry up for a journey", "¤ • mean" etc.) in step 105 one by one, that is, for example, "S— plan" corresponds to "mean", "plan", "project" and so on; "ó wa̋ḧt" corresponds to "want', "aim", "desire", "require", "feel like", "intend" an so on;

"← hope" corresponds to "intend", "hope", "want" and so on; and other words (not listed herein for simplicity). The translated words in the first language obtained in this step may be used as the words of the concept knowledge built by the method of the present embodiment.

Figure 2:
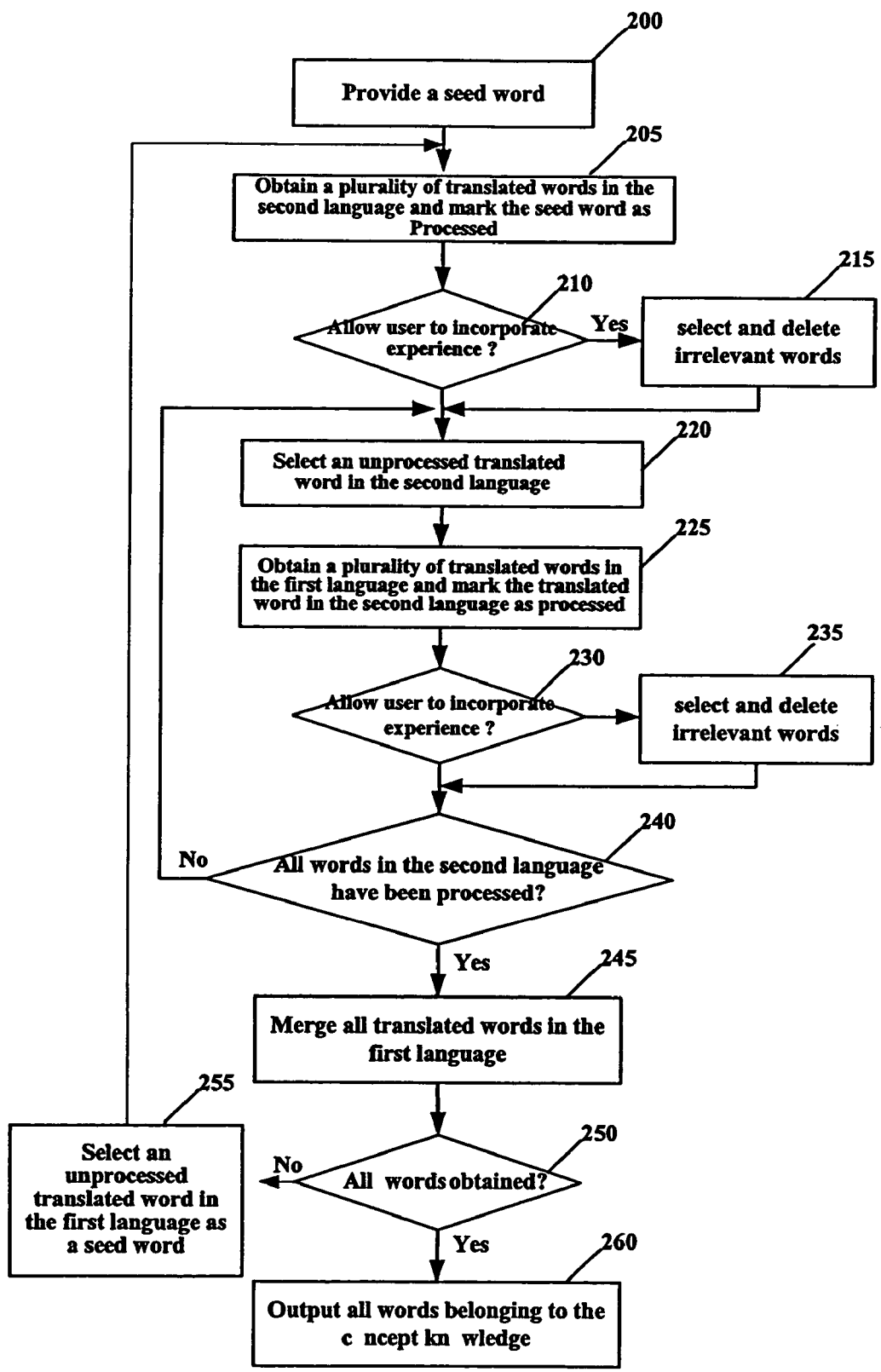
FIG. 2 is a detailed flowchart showing the method for building concept knowledge in a computer system from a machine-readable dictionary according to another preferred embodiment of the present invention.

FIG. 2 is a detailed flowchart showing the method for building concept knowledge in a computer system from a machine-readable dictionary according to another preferred embodiment of the present invention. Similar to the previous embodiment, first at Step 200, a seed word is provided. Then, at Step 205, a plurality of translated words in a second language corresponding to the seed word are obtained by looking up the machine-readable dictionary and the seed word is marked as processed. The mark will be used in Step 255 to determine whether a corresponding word has been processed.

Then, at Step 210, a determination is made as to whether it is allowed for the user to incorporate his experience. If yes, at Step 215, the user can select and delete the words that he considers to be irrelevant. The purpose of this step is to improve specificity of the final result and avoid influence of irrelevant words. Still taking the seed word "intend" as an example, in the plurality of corresponding Chinese translated words, if the user considers that "î,
aim at", "vī
hurry up for journey" and "¤ •
mean" are irrelevant words, he can delete them in this step.

Next, at Step 220, an unprocessed translated word in the second language is selected. At Step 225, a plurality of translated words in the first language corresponding to the selected translated word in the second language are obtained by looking up the machine-readable dictionary, and the translated word in the second language is marked as processed. The mark will be used in Step 240 to determine whether a corresponding word has been processed. Then, at Step 230, a determination is made as to whether it is allowed for the user to incorporate his experience. If yes, in Step 235, the user can select and delete the words that he considers to be irrelevant. The purpose of this step is also to improve specificity of the final result and avoid the influence of irrelevant words.

Next, at Step 240, a determination is made as to whether all words in the second language have been processed. If the result of determination is "Yes", then the process proceeds to Step 245, otherwise returns to Step 220 to select another translated word in the second language and repeat the steps 220-240, until all the translated words in the second language have been processed.

Then, at Step 245, all translated words in the first language are merged and the process proceeds to Step 250, where a determination is made as to whether all words required by the user are obtained. If the result of determination is "Yes", then the process proceeds to Step 260; otherwise the process proceeds to Step 255 selecting an unprocessed translated word in the first language and then repeats the steps 205-250. As the number of times of repeat increases, the number of the words obtained for the concept knowledge increases; meanwhile a situation may appear in which all translated words in the first language obtained have been processed as seed word after a certain number of times of repeat, that is, new word would no more appear even if further repeat is made. Therefore, the determination criteria in Step 250 may be "the number of times of repeat has reached a predetermined value" or "the number of obtained words of concept knowledge has reached a predetermined value" or "all of the translated words in the first language have been processed as seed word".

Finally, at Step 260, all obtained words belonging to the concept knowledge are output. Since it may be the case that different words are translated by a same word in a dictionary, in this embodiment duplicate words need to be merged together in order to guarantee that no duplicate words exist in the result.

Figure 3:
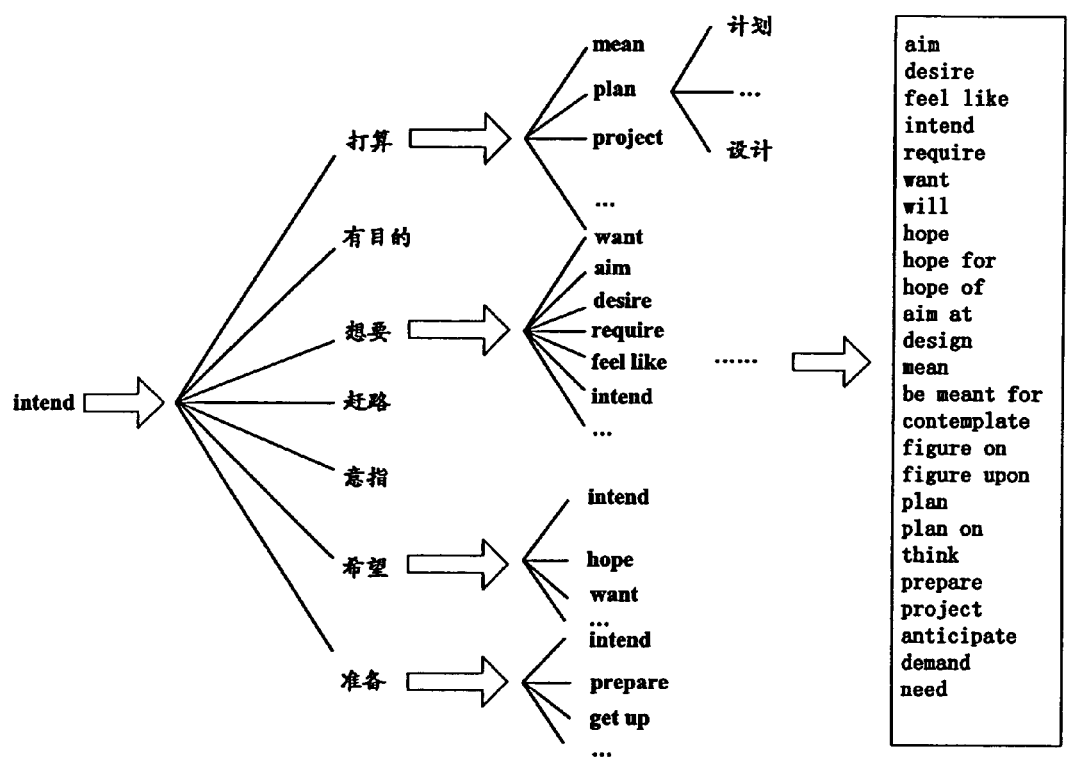
FIG. 3 schematically shows the process of building concept knowledge in a computer system from a machine-readable dictionary according to a preferred embodiment of the present invention.

FIG. 3, taking the seed word "intend" as an example, shows the process of building concept knowledge in a computer system from a machine-readable dictionary according to the preferred embodiment of the present invention. In FIG. 3 it can be seen that after several times of repeated translations from "Chinese" to "English" and from "English" to "Chinese", a large number of words, which belong to the concept knowledge relevant to "intend/plan", are finally obtained.

Furthermore, according to an embodiment of the present invention, a monolingual machine-readable dictionary may be used; that is, the first language is the same as the second language. For example, using a machine-readable dictionary with a single Chinese language, the invention can also obtain a plurality of words belonging to a concept knowledge. This is because that vocabulary and a plurality of corresponding translated words are also preserved in a monolingual machine-readable dictionary.

Further, according to an embodiment of the present invention, the machine-readable dictionary may be a multilingual dictionary; that is, it contains vocabularies in a plurality of languages and a plurality of corresponding translated words. For example, it may include English vocabulary and corresponding Chinese translations, Chinese vocabulary and corresponding French translations, and French vocabulary and corresponding English translations and so on. After a plurality of translated words in the second language corresponding to a seed word have been obtained; that is, after Step 105 shown in FIG. 1, the method of the embodiment further includes an iteration step: executing Step 105 with one of the languages included in the machine-readable dictionary as the second language and with each of the translated words obtained as seed word. The criteria for terminating the iteration may be "the number of iterations has reached a predetermined value" or "the number of translated words obtained has reached a predetermined value". After the iteration step, the process proceeds to Step 110. Taking an example to illustrate this embodiment, after inputting "intend" as a seed word, through translation processing such as English to Chinese, Chinese to French, French to German and German to English, sufficient number of words belonging to concept knowledge of "intend" can be obtained.

Figure 4:
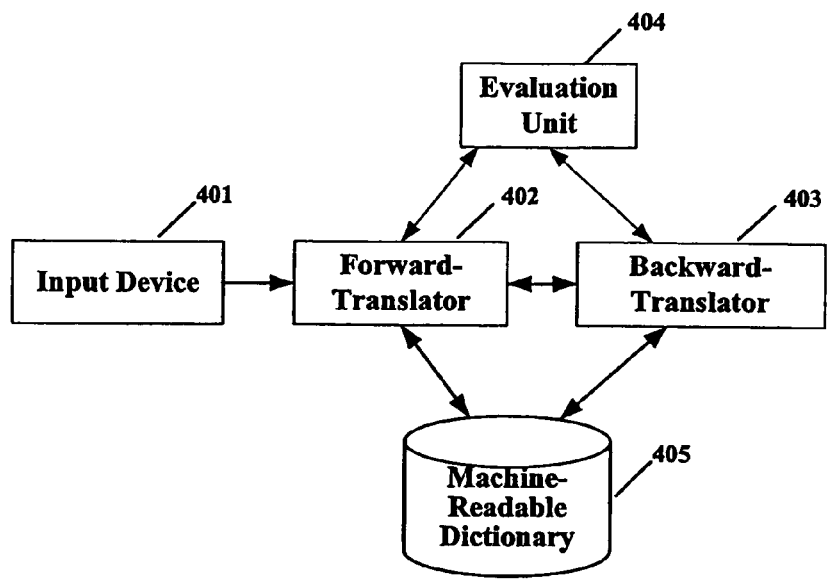
FIG. 4 is a block diagram showing the computer system for building concept knowledge from a machine-readable dictionary according to a preferred embodiment of the present invention.

FIG. 4 is a block diagram showing the computer system for building concept knowledge from a machine-readable dictionary according to a preferred embodiment of the present invention. The computer system in the embodiments of the present invention may be, for example, a PC, computer server, notebook, palm, PDA or other kind of computing devices. These computer systems usually includes a central processing unit; an input device, such as keyboard, mouse or the like; storage device, such as memory, hard disk or the like; and a bus for connecting these components. The computer system may also have a network interface for communicating with other computer systems, such as network adapter, modem or the like, as known to those skilled in the art.

As shown in FIG. 4, the computer system for building concept knowledge according to the present embodiment further includes: an input device 401, a forward-translator 402, a backward-translator 403, an evaluation unit 404 and a machine-readable dictionary 405.

Figure 7:
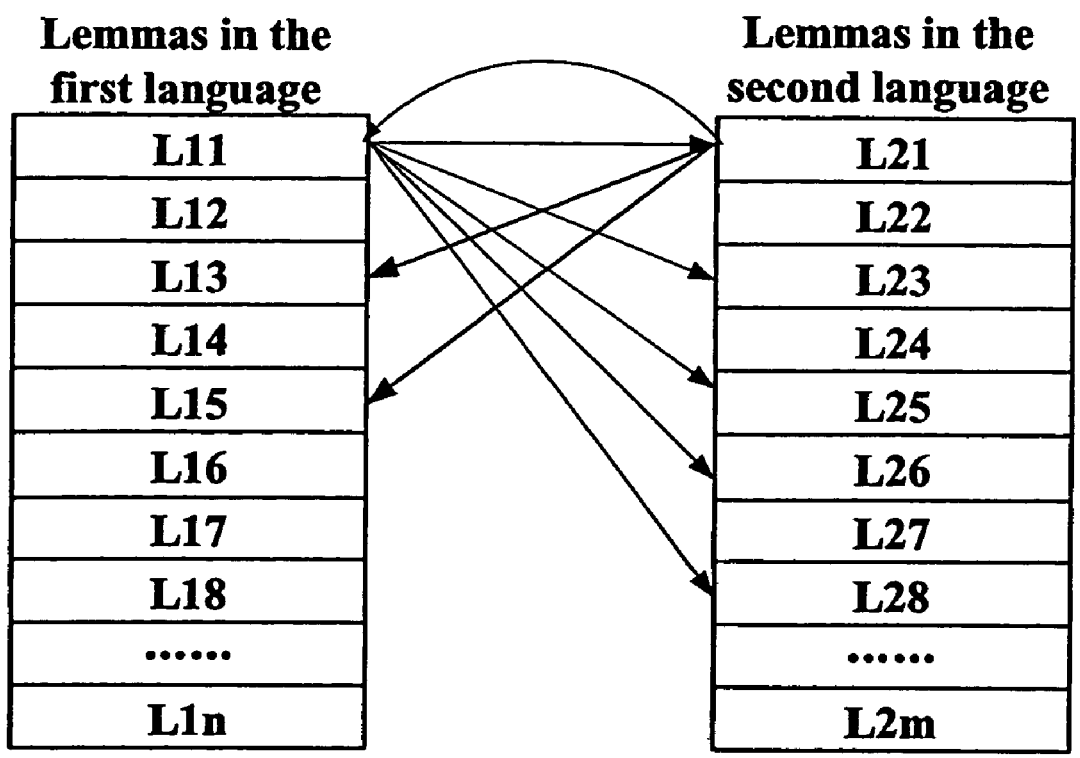
FIG. 7 is an example illustrated the machine-readable dictionary in an embodiments of the present invention.

The machine-readable dictionary 405 comprises a plurality of words in a first language and a plurality of corresponding translated words in a second language, and a plurality of words in the second language and a plurality of corresponding translated words in the first language. FIG. 7 shows an example of the machine-readable dictionary used in the embodiment of the present invention. In that figure, lemmas L11-L1n in the first language and lemmas L21-L2m in the second language, and their corresponding relations (i.e. the arrowed lines in the figure) are stored in the machine-readable dictionary 405. The machine-readable dictionary 405 may be implemented in the form of a database or computer files, and may be located in a storage that can be accessed via a network adapter, as known to those skilled in the art.

The input device 401 is used for inputting seed word and transferring seed word to the forward-translator 402. The input device 401 can be implemented by providing for the user with an input interface, such as an input box and having the user input the seed word through the input box, or by inputting a seed word from another computer via an network or automatically picking up a seed word from a file. In the following embodiments, the input device 401 may also be a keyword input means of a search engine.

Forward-translator 402 acquires a plurality of translated words in the second language corresponding to the seed word by looking up the machine-readable dictionary 405, and transfers these words to the backward-translator 403. Supposing that the seed word input from the input device 401 and transferred to the forward-translator 402 is "intend", the forward-translator 402 looks up the lemma "intend" in the machine-readable dictionary 405 and, according to the corresponding relations in the dictionary 405, obtains corresponding translated Chinese words "S— plan", "ó □
want", "←
hope", "Æ•
prepare", "í"
aim at", "vï
hurry up for a journey", "ɑ •
mean" and the like.

The backward-translator 403 obtains a plurality of translated words in the first language corresponding to each of said plurality of translated words obtained by the forward-translator 402 respectively as words of the concept knowledge, by looking up said machine-readable dictionary. Still taking the above example with "intend" as the seed word, the backward-translator 403 finds corresponding translated words in the first language for the Chinese translated words (i.e. "S— plan", "ó □
want", "←
hope", "Æ•
prepare", "í,
aim at", "vï
hurry up for a journey", "ɑ •
mean" etc.) obtained by forward-translator 402 one by one, that is, for example, "S—
plan" corresponds to "mean", "plan", "project" and so on; "ó waňt" corresponds to "want', "aim", "desire", "require", "feel like", "intend" an so on;
"← hope" corresponds to "intend", "hope", "want" and so on; and other words (not listed herein for simplicity).

The use of evaluation unit 404 allows the user to select and delete the translated words, and to evaluate sufficiency of the words of the concept knowledge. With the evaluation unit 404, the user can select and delete the words considered to be irrelevant according to experience, from those obtained by the forward-translator 402 and backward-translator 403, so as to improve specificity of the final result and avoid the influence of irrelevant words.

Figure 8:
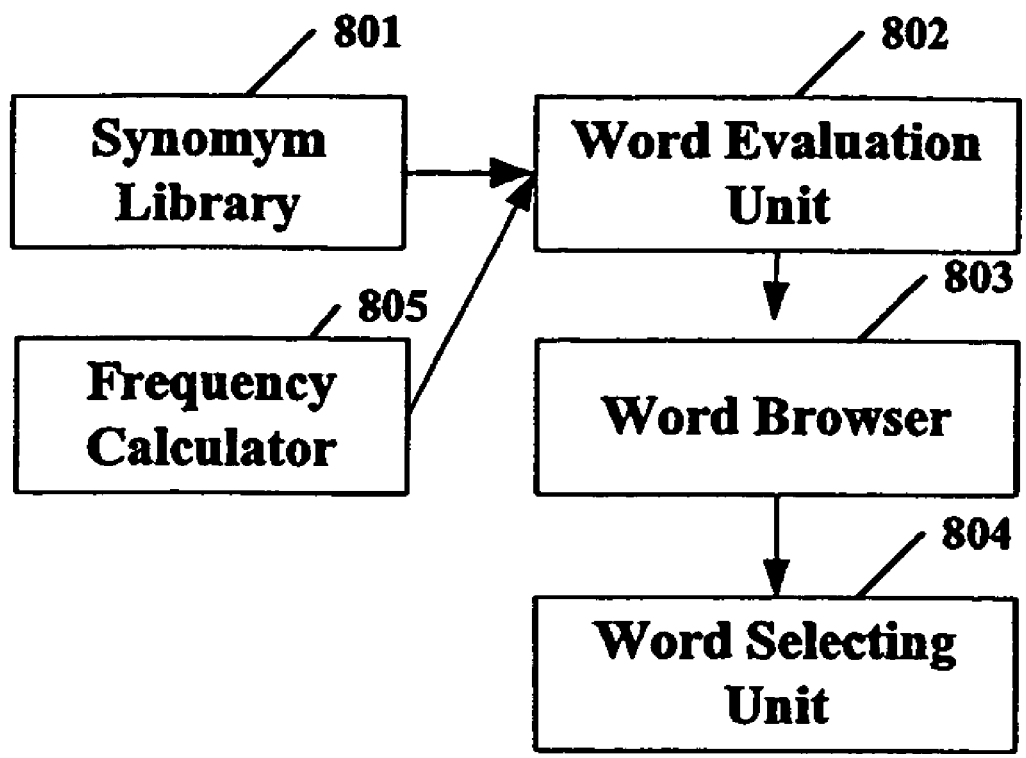
FIG. 8 is a schematic block diagram showing the structure of the evaluation unit in an embodiment of the present invention.
Figure 9A:
FIG. 9A and 9B schematically show the interfaces provided for users to select and delete translated words in an embodiment of the present invention.
Figure 9B:
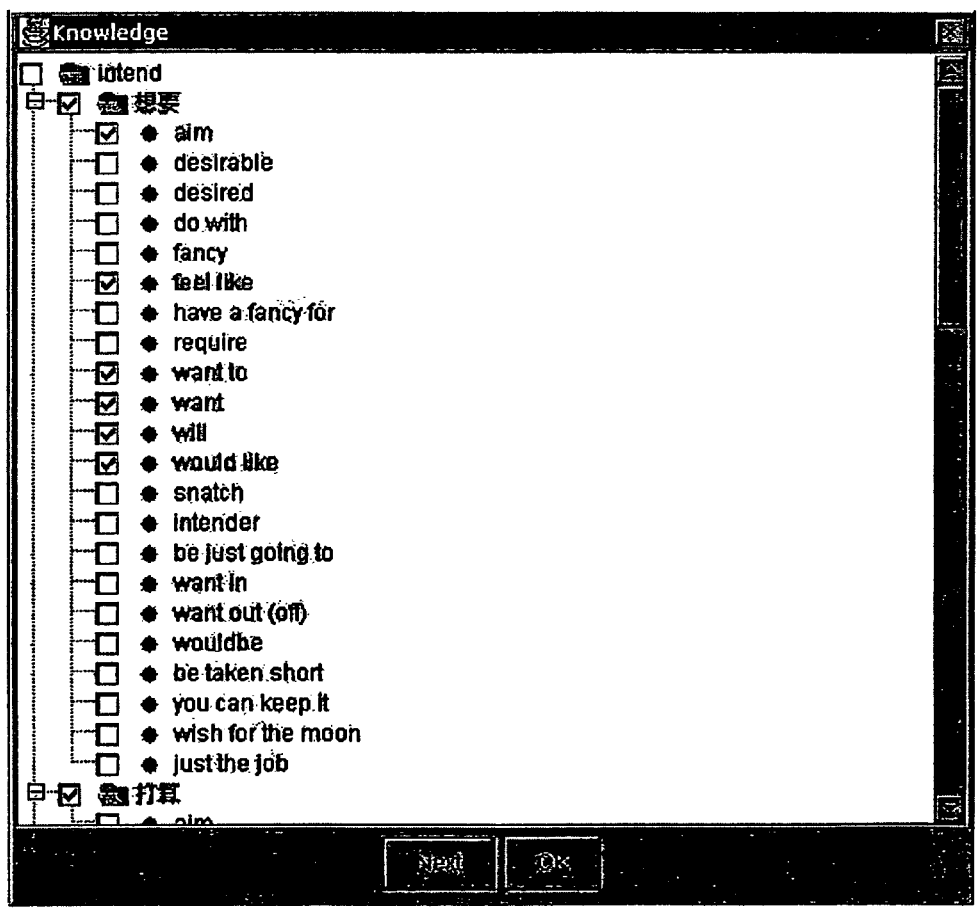

FIG. 8 is a schematic block diagram showing the structure of the evaluation unit 404 in the embodiment of the present invention. The evaluation unit 404 includes: a synonym library 801 for storing synonymous words, i.e. synonymous word groups of a given word; a frequency calculator 805 for calculating the number of times each word occurred in the translating process; a word evaluation unit 802 for ranking obtained translated words based on the synonym library and the frequency calculator, for example, putting the words contained in the synonym library 801 at the beginning, then in a descend order of appearance frequencies calculated by the frequency calculator 805; a word browse 803 for presenting the ranked words to the user; word selecting unit 804 for allowing the user to select desired words and delete irrelevant words. FIG. 9A and 9B schematically show the interfaces provided for the user to select and delete translated words in the embodiment of the present invention. With the user interfaces as shown in FIG. 9A and 9B, the user can browse and select the translated words.

Alternatively, the machine-readable dictionary 405 in the embodiment may be one that contains translated words in the same language as that of the words to be translated, that is, the first language and the second language are the same.

Figure 5:
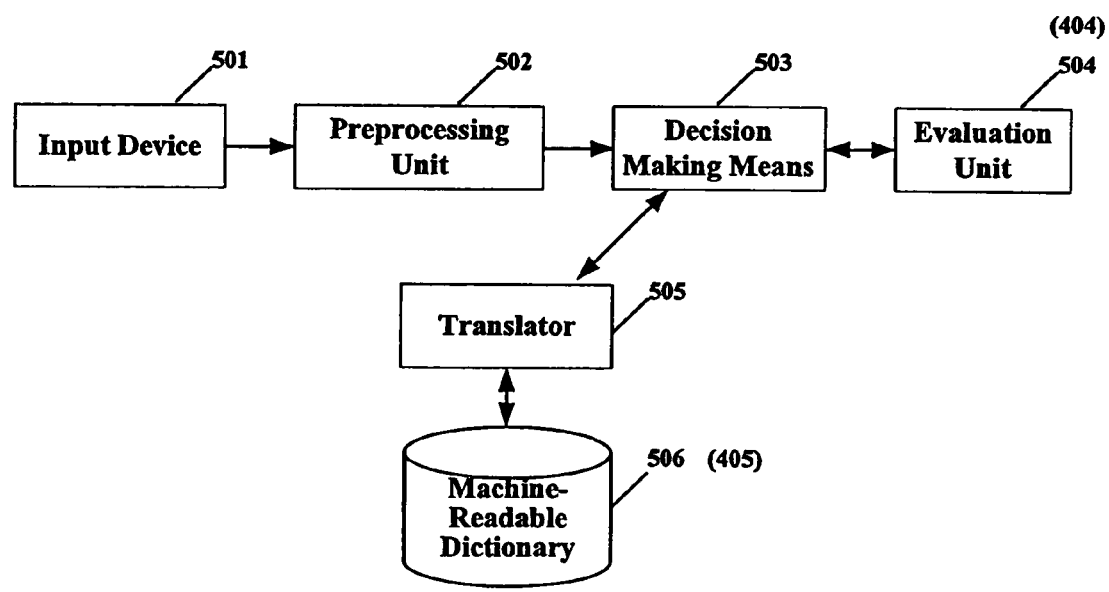
FIG. 5 is a block diagram showing the computer system for building concept knowledge from a machine-readable dictionary according to another preferred embodiment of the present invention.

FIG. 5 is a block diagram showing the computer system for building concept knowledge from a machine-readable dictionary according to another preferred embodiment of the present invention. As shown in FIG. 5, the computer system for building concept knowledge in the present embodiment includes: input device 401, preprocessing unit 502, decision making means 503, evaluation unit 404, translator 505 and machine-readable dictionary 405, in which the same components as those in the embodiment shown in FIG. 4 are designated with the same numerals and their description is omitted for simplicity.

In addition to the same components as shown in FIG. 4, the computer system of the embodiment further includes a preprocessing unit 502 for preprocessing the seed word input via the input device 401, for example, spell-checking the seed word, finding out the original form of the word (for example, if the input seed word is in the form of a participle, such as "worked", the preprocessing unit can convert it to "work") and so on.

The translator 505 is used for translating received words into a plurality of translated words in a desired language by looking up the machine-readable dictionary. The translator 505 in this embodiment is capable of translating a word in one language into translated words in another language under the control of the decision-making means 503.

The decision making means 503 is capable of controlling the translating operation of the translator 505, sending words that need to be translated to the translator 505 and determining desired language of the translated words, and merging the words obtained. In this embodiment, the process of forward translation and backward translation are performed in the manner that the translator 505 is controlled by the decision making means 503.

Alternatively, the machine-readable dictionary 506 in the embodiment may contain translated words in the same language as the words to be translated, that is, the first language and the second language are the same.

Alternatively, the machine-readable dictionary 506 may be a multilingual dictionary, that is, it contains words in a plurality of languages and a plurality of corresponding translated words. For example, the dictionary may include English vocabulary and corresponding Chinese translations, Chinese vocabulary and corresponding French translations, and French vocabulary and corresponding English translations and so on. The decision making means 503 is also capable of controlling the translator 505 to obtain words of the concept knowledge through translation processes among the plurality of languages. For example, the seed word "intend" in English, passes through translation processes of English to Chinese, Chinese to French, French to German and German to English; finally the words of the concept knowledge associated with "intend" are obtained.

The components of the computer system in the above-described embodiment of the present invention may be implemented by software or hardware, as can be appreciated by those skilled in the art.

There is also provided a search engine and a method for information retrieval that applies the above-described technology for building concept knowledge in accordance with the invention.

A search engine is a computer system that collects and organizes information resources on the Internet for users' searching.

Typically, the workflow of a search engine includes following three steps: 1. finding and collecting web information on the Internet; 2. extracting and organizing the information to establish a index library; and 3. retrieving documents from the index library by a retrieval unit according to the query keyword input by a user, evaluating the correlation degrees between the documents and the query, ranking the output results and outputting the search result to the user.

Following problems exist in existing search engines: first is the problem of "expression faithfulness". In many cases, it is difficult for a user to truly express the content he really wants to search simply with a keyword or a string of keywords. The difficulty in expression leads to a difficulty in retrieval. Second is the problem of "difference in expression". In human natural languages, with the changes in time, geographical region and technical field, the same concept may be expressed in different linguistic forms of expression. Therefore, different users may use different keywords to search for the same concept. For example, "¡—:

computer" and "5◀ computer", "*)P:

space shuttle" and "*z— space shuttle". On the Chinese Yahoo, the web pages containing "*z— space shuttle" can not be found if "*)P:

space shuttle" is used as the keyword, though they mean the same thing.

If the above-described technology of the invention for building concept knowledge applies to the search engine computer system, the problems can be solved effectively. Words in the concept knowledge can be used to expand the keywords input by the user, so that to establish a knowledge-based information retrieval approach, which can make users to find what they want more quickly and understand it better. Thus, information retrieval will be raised from present keyword-based level to the knowledge-based (or concept-based) level.

A computer system for building concept knowledge, as above described, is combined with a search engine in accordance with an embodiment of the invention. After a user inputs a keyword for retrieval, the process of building concept knowledge is performed with the input keyword as a seed word, to obtain a plurality of words belonging to the same concept knowledge. Then, the obtained words of the concept knowledge are transferred to the search engine, which uses the plurality of words to retrieve and provides the search results to the user, therefore the information retrieval is performed on the knowledge-based (or concept-based) level instead of keyword-based level. In practical implementation, a computer system of the above-mentioned embodiments for building concept knowledge can be operably connected to a search engine to form a new system, or the components of a computer system of the above-mentioned embodiments for building concept knowledge can be incorporated in a search engine, as can be appreciated by those skilled in the art.

In addition, there is provided a method for informational retrieval in a computer system in accordance with an embodiment of the present invention. After a user inputs a keyword, the method for building concept knowledge as described in the above embodiments is performed with the input keyword as a seed word, so that a plurality of words belonging to the same concept knowledge are obtained and then the information are retrieved by means of using the obtained words.

Though the invention has been described in detail with some illustrative embodiments, these embodiments are not exhaustive. Those skilled in the art may make various changes and modifications within the spirit and scope of the invention. Therefore, the present invention is not limited to these embodiments, and the scope of the invention is only defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A computer system for building concept knowledge from a machine-readable dictionary for use by a search engine to facilitate quick and accurate information retrieval, comprising
    a machine-readable dictionary including a plurality of words in a first language and a plurality of corresponding translated words in a second language, and a plurality of words in the second language and a plurality of corresponding translated words in the first language;
    an input device for inputting a seed word;
    a forward-translator for obtaining a plurality of translated words in the second language corresponding to said seed word by looking up said machine-readable dictionary;
    a backward-translator for obtaining a plurality of translated words in the first language corresponding to each of said plurality of translated words obtained by said translator respectively as words of the concept knowledge, by looking up said machine-readable dictionary;
    a synonym library for storing synonymous words of each translated word in the first language and in the second language;
    a frequency calculator for calculating the number of times each translated word occurs during obtaining said translated words in the second language and during obtaining said translated words in the first language;
    an evaluation unit for ranking said translated words in the first language and in the second language based on the synonym library and the frequency calculator;
    a word browser for presenting said ranked words to a user;
    a word selecting unit for allowing said user to select desired words among said ranked words and to delete irrelevant words among said ranked words; and
    means for providing said selected desired words to said search engine to perform knowledge-based information retrieval instead of keyword-based information retrieval.

2. The computer system for building concept knowledge from a machine-readable dictionary for use by a search engine to facilitate quick and accurate information retrieval in accordance with claim 1, wherein said first language and said second language are the same language.

3. The computer system for building concept knowledge from a machine-readable dictionary for use by a search engine to facilitate quick and accurate information retrieval in accordance with claim 1, wherein said computer system for building concept knowledge is connected to a search engine and builds the concept knowledge with a keyword input by a user as the seed word, and the obtained words of the concept knowledge are provided to the search engine for information retrieval.

4. A computer system for building concept knowledge from a machine-readable dictionary for use by a search engine to facilitate quick and accurate information retrieval, comprising
    a machine-readable dictionary including a plurality of words in a first language and a plurality of corresponding translated words in a second language, and a plurality of words in the second language and a plurality of corresponding translated words in the first language;
    an input device for inputting a seed word;
    a translator for translating a word into a plurality of translated words in a desired language by looking up said machine-readable dictionary;
    a decision making means for controlling said translator to translate the seed word into a plurality of translated words in the second language and to translate each of the translated words in second language into a plurality of translated words in the first language respectively as words of the concept knowledge;
    a synonym library for storing synonymous words of each translated word in the first language and in the second language;
    a frequency calculator for calculating the number of times each translated word occurs during said translating;
    an evaluation unit for ranking said translated words in the first language and in the second language based on the synonym library and the frequency calculator;
    a word browser for presenting said ranked words to a user;
    a word selecting unit for allowing said user to select desired words among said ranked words and to delete irrelevant words among said ranked words; and
    means for providing said selected desired words to said search engine to perform knowledge-based information retrieval instead of keyword-based information retrieval.

5. The computer system for building concept knowledge from a machine-readable dictionary for use by a search engine to facilitate quick and accurate information retrieval in accordance with claim 4, wherein said first language and said second language are the same language.

6. The computer system for building concept knowledge from a machine-readable dictionary for use by a search engine to facilitate quick and accurate information retrieval in accordance with claim 4, wherein said decision making means repeat the translation of the translated words between the first language and the second language until a predefined number of times is reached, or a predefined number of the translated words are obtained, or all of the translated words in the first language have been translated as seed words.

7. The computer system for building concept knowledge from a machine-readable dictionary for use by a search engine to facilitate quick and accurate information retrieval in accordance with claim 4, wherein said machine-readable dictionary contains words in more than two languages and corresponding relations thereamong;

wherein said decision making means repeat the translation of the translated words among said plurality of languages until a predefined number of times is reached, or a predefined number of the translated words are obtained, or all of the translated words in the first language have been translated as seed words.

8. The computer system for building concept knowledge from a machine-readable dictionary for use by a search engine in accordance with claim 4, wherein said computer system further comprises, a preprocessing unit for preprocessing said seed word to spell-check said seed word or to find out an original form of said seed word.

9. A method for building concept knowledge in a computer system from a machine-readable dictionary for use by a search engine to facilitate quick and accurate information retrieval, the machine-readable dictionary including a plurality of words in a first language and a plurality of corresponding translated words in a second language, and a plurality of words in the second language and a plurality of corresponding translated words in the first language, said method comprising steps of:

providing a seed word in the first language;
forward-translating said seed word to obtain a plurality of translated words corresponding to said seed word by looking up said machine-readable dictionary;
backward-translating said translated words to obtain a plurality of translated words in the first language corresponding to each of said plurality of translated words obtained by said step of forward-translating respectively, as words of the concept knowledge, by looking up said machine-readable dictionary;
storing synonymous words of each translated word in said first language and in said second language;
calculating frequency of each translated word in said first language and in said second language;
ranking said translated words based on said stored synonymous words and said calculated frequency;
presenting said ranked words to a user for allowing the user to select desired words among said ranked words and to delete irrelevant words among said ranked words; and
providing the selected desired words to said search engine to perform information retrieval on a knowledge-based level instead of a keyword-based level.

10. The method for building concept knowledge in a computer system from a machine-readable dictionary for use by a search engine to facilitate quick and accurate information retrieval in accordance with claim 9, wherein said method further comprises a step of merging redundant words when there are two or more identical words among the words of the concept knowledge.

11. The method for building concept knowledge in a computer system from a machine-readable dictionary for use by a search engine to facilitate quick and accurate information retrieval in accordance with claim 10, wherein said method further comprises a step of repeating said step of forward-translating and said step of backward-translating by taking said plurality of words of the concept knowledge obtained by the step of backward-translating as seed words respectively, until a predefined number of times is reached, or a predefined number of the words of the concept knowledge are obtained.

12. The method for building concept knowledge in a computer system from a machine-readable dictionary for use by a search engine to facilitate quick and accurate information retrieval in accordance with claim 11, wherein said step of forward-translating further comprises recording the seed words that have been translated as processed; said step of repeating ends when all translated words in the first language obtained are processed.

13. The method for building concept knowledge in a computer system from a machine-readable dictionary for use by a search engine to facilitate quick and accurate information retrieval in accordance with claim 9, wherein said step of forward-translating further allows a user to select and delete one or more translated words.

14. The method for building concept knowledge in a computer system from a machine-readable dictionary for use by a search engine to facilitate quick and accurate information retrieval in accordance with claim 9, wherein said step of backward-translating further allows a user to select and delete one or more translated words.

15. The method for building concept knowledge in a computer system from a machine-readable dictionary for use by a search engine to facilitate quick and accurate information retrieval in accordance with claim 9, wherein said first language and said second language are the same language.

16. The method for building concept knowledge in a computer system from a machine-readable dictionary for use by a search engine to facilitate quick and accurate information retrieval in accordance with claim 9, wherein said machine-readable dictionary contains words in more than two languages and corresponding relations thereamong; said method further comprises, after said step of forward-translating, a step of iterating said step of forward-translating with any one language from said more than two languages as the second language and each of the translated words obtained as the seed word respectively, until a predefined number of times is reached, or a predefined number of the translated words are obtained, or all of the translated words in the first language have been translated as seed words.

17. A method for information retrieval in a computer system for use by a search engine to facilitate quick and accurate information retrieval comprising, obtaining a plurality of words belonging to a concept knowledge associated with a keyword, by the method of claim 9, with said keyword as the seed word;
retrieving information using said plurality of words of the concept knowledge obtained.

18. The method for building concept knowledge in a computer system from a machine-readable dictionary for use by a search engine in accordance with claim 9, wherein said seed word is provided from another computer system via a network.

19. The method for building concept knowledge in a computer system from a machine-readable dictionary for use by a search engine in accordance with claim 9, wherein said seed word is provided by being automatically selected from a file.

20. A program storage device readable by machine, tangibly embodying a program of instructions executable by the machine to perform method steps for building concept knowledge in a computer system, said method steps comprising the steps of claim 9.

21. A program storage device readable by machine, tangibly embodying a program of instructions executable by the machine to perform method steps for information retrieval, said method steps comprising the steps of claim 17.

22. A computer program product comprising a computer usable medium having computer usable program code embodied therein for causing the building of concept knowledge from a machine-readable dictionary, the computer usable program code in said computer program product comprising computer readable instructions executable by a computer for causing the computer to effect the functions of claim 1.

* * * * *